United States Patent
Yee et al.

(10) Patent No.: US 10,689,837 B2
(45) Date of Patent: Jun. 23, 2020

(54) FLUSHOMETER

(71) Applicant: Kohler Co., Kohler, WI (US)

(72) Inventors: Evan S. Yee, Grafton, WI (US); Chad J. Cochart, Sheboygan, WI (US); Balachander Venugopal, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/380,606

(22) Filed: Dec. 15, 2016

(65) Prior Publication Data

US 2018/0171613 A1 Jun. 21, 2018

(51) Int. Cl.
*E03D 3/04* (2006.01)
*F16K 31/383* (2006.01)
*F16K 21/16* (2006.01)

(52) U.S. Cl.
CPC ............. *E03D 3/04* (2013.01); *F16K 21/16* (2013.01); *F16K 31/3835* (2013.01)

(58) Field of Classification Search
CPC .... E03D 3/04; E03D 3/02; E03D 5/09; F16K 31/3835; F16K 31/383; F16K 31/38; F16K 31/36; F16K 31/363; F16K 31/16; F16K 31/165; F16K 21/16; F16K 31/44
USPC ............. 251/40, 33, 366–367; 137/550, 544
See application file for complete search history.

(56) References Cited

U.S. PATENT DOCUMENTS

| | | | | |
|---|---|---|---|---|
| 2,369,104 A | * | 2/1945 | Fredrickson | E03D 3/04 137/630 |
| 2,470,925 A | * | 5/1949 | Fredrickson | E03D 3/04 277/438 |
| 2,734,712 A | * | 2/1956 | Fraser | E03D 3/12 251/35 |

(Continued)

FOREIGN PATENT DOCUMENTS

| | | |
|---|---|---|
| CN | 1396348 | 2/2003 |
| CN | 1609356 | 4/2005 |
| WO | WO 2011097196 | 8/2011 |

OTHER PUBLICATIONS

Tadiran Lithium Batteries, Pulses Plus, Model TLP-92311/A/SM, Rev. C, Dec. 2004, 2 pages.

(Continued)

*Primary Examiner* — Craig J Price
*Assistant Examiner* — Andrew J Rost
(74) *Attorney, Agent, or Firm* — Foley & Lardner LLP

(57) ABSTRACT

A flushometer valve includes a hollow body and a piston assembly disposed inside the hollow body for controlling operation of the flushometer valve. The piston assembly and hollow body define an inlet chamber, an outlet chamber and a pressure chamber. The piston assembly includes a flow guide, a piston top, and an insert. The flow guide is movable relative to the hollow body between an open position, in which the outlet chamber is fluidly connected to the inlet chamber, and a closed position, in which the outlet chamber is fluidly disconnected from the inlet chamber. The piston top is coupled to the flow guide, includes a first material, and (Continued)

has a bleed passage that fluidly connects the pressure chamber and the inlet chamber. The insert is disposed within the bleed passage, includes a second material, and has a bore that fluidly connects the bleed passage and the pressure chamber.

13 Claims, 11 Drawing Sheets

(56) References Cited

U.S. PATENT DOCUMENTS

| | | | | |
|---|---|---|---|---|
| 3,008,683 | A * | 11/1961 | Filliung | E03D 3/04 |
| | | | | 137/360 |
| 4,034,423 | A | 7/1977 | Milnes | |
| 4,793,588 | A | 12/1988 | Laverty, Jr. | |
| 5,169,118 | A | 12/1992 | Whiteside | |
| 5,663,007 | A | 9/1997 | Ikoma et al. | |
| 5,881,993 | A * | 3/1999 | Wilson | E03D 3/04 |
| | | | | 138/45 |
| 5,979,482 | A | 11/1999 | Scott | |
| 6,000,674 | A | 12/1999 | Cheng | |
| 6,019,343 | A * | 2/2000 | Tsai | E03D 3/06 |
| | | | | 251/129.03 |
| 6,041,809 | A | 3/2000 | Johnson | |
| 6,046,300 | A * | 4/2000 | Umetsu | C08G 63/60 |
| | | | | 528/176 |
| 6,056,261 | A | 5/2000 | Aparicio et al. | |
| 6,349,921 | B1 | 2/2002 | Jahrling | |
| 6,460,825 | B1 * | 10/2002 | Nortier | F16K 31/3835 |
| | | | | 251/285 |
| 6,616,119 | B2 * | 9/2003 | Wilson | E03D 3/06 |
| | | | | 251/40 |
| 6,926,247 | B2 | 8/2005 | Nortier | |
| 8,826,932 | B2 * | 9/2014 | Seal | E03C 1/04 |
| | | | | 137/119.04 |
| 8,826,937 | B2 * | 9/2014 | Stauder | E03C 1/106 |
| | | | | 137/512 |
| 8,895,089 | B2 | 11/2014 | Sumida | |
| 2001/0020490 | A1 | 9/2001 | Lorenzelli et al. | |
| 2002/0017326 | A1 | 2/2002 | Lorenzelli et al. | |
| 2008/0199737 | A1 | 8/2008 | Kazaryan et al. | |
| 2011/0189507 | A1 | 8/2011 | Reis et al. | |
| 2014/0053922 | A1 | 2/2014 | Wilson | |
| 2014/0117265 | A1 | 5/2014 | Cochart et al. | |

OTHER PUBLICATIONS

Extended European Search Report for Application No. EP13190399 dated Feb. 18, 2014 (8 pages).

* cited by examiner

FLUSHOMETER

BACKGROUND

The present application relates generally to the field of flushometers for use with urinals, toilets, water closets, and other devices. More specifically, this application relates to piston-type flushometers having piston assemblies for improved performance and durability.

SUMMARY

At least one embodiment of the application relates to a flushometer (e.g., a flushometer valve) for use with urinals, toilets and water closets. The flushometer valve includes a hollow body and a piston assembly that is disposed inside the hollow body for controlling operation of the flushometer valve. The piston assembly and the hollow body define an inlet chamber, an outlet chamber and a pressure chamber. The piston assembly includes a flow guide, a piston top, and an insert. The flow guide is movable relative to the hollow body between an open position, in which the outlet chamber is fluidly connected to the inlet chamber, and a closed position, in which the outlet chamber is fluidly disconnected from the inlet chamber. The piston top is coupled to the flow guide, includes a first material, and has a bleed passage that fluidly connects the pressure chamber and the inlet chamber. The insert is disposed within the bleed passage, includes a second material that is different than the first material, and has a bore that fluidly connects the bleed passage and the pressure chamber.

The first material may include any combination of (e.g., at least two of) a polyphenylene oxide, a polyphenylene ether, and/or a polystyrene. Non-limiting examples of the first material are Noryl and other similar materials that do not include any glass content. The second material may include a polymer and a glass filler.

The bore of the insert may have a minimum diameter that is sized to fill the pressure chamber within a threshold time. The bore of the insert may have an inlet diameter, which is smaller than a diameter of the bleed passage, and an outlet diameter, which is smaller than the inlet diameter. The bore of the insert may have an inlet section that narrows in diameter moving from an inlet of the bore toward an outlet of the bore, where the inlet section defines a venturi within the bore.

The insert may include a base, which is disposed in a counterbore of the piston top, and a shoulder, which extends away from the base and is disposed in the bleed passage. The shoulder may have an outer diameter, which is smaller than an outer diameter of the base, and an undercut recess, which is located at the base and receives a rib for coupling the insert to the piston top.

The flushometer may include a seal carried by the flow guide. The seal contacts a valve seat of the hollow body in the closed position and is separated from the valve seat in the open position to fluidly connect the inlet and outlet chambers.

The flushometer valve may include a seal seat coupled to the flow guide to secure the seal between the flow guide and the seal seat. The seal seat may be disposed between the flow guide and the piston top to limit travel of the seal seat relative to the flow guide. The seal seat may include a bleed passage that fluidly connects the bleed passage of the piston top and the inlet chamber.

At least one embodiment relates to a flushometer (e.g., a flushometer valve) for use with urinals, toilets and water closets that includes a hollow valve body and a piston assembly. The hollow valve body includes an inlet chamber, an outlet chamber, and a valve seat. The piston assembly is disposed inside of and is movable relative to the hollow valve body between an open position, in which the outlet chamber is fluidly connected to the inlet chamber, and a closed position, in which the outlet chamber is fluidly disconnected from the inlet chamber. The piston assembly includes a flow guide, a seal seat, and a seal. The flow guide has a generally annular base that extends longitudinally, a flange extending radially outward from the base, and a first catch offset longitudinally from the flange and extending radially outward from the base. The seal seat has a generally annular body, which is disposed around the base, and a second catch that extends radially inward from the body and engages the first catch to prevent relative motion between the flow guide and seal seat longitudinally. The seal is retained between an end of the seal seat and the flange of the flow guide, and the seal engages the valve seat in the closed position of the piston assembly.

The seal may be compliant and may be retained between the seal seat and the flow guide in a compressed state to impart a biasing force between the first and second catches. The biasing force may be configured to bias the first and second catches toward one another into a locking position.

The first catch may include a plurality of outer projections arranged in an annular array around a circumference of the flow guide, with each outer projection extending radially outward from the base, and with each pair of adjacent outer projections is separated by a first angular gap.

The second catch may include a single continuous annular inner projection that extends radially inwardly from the body. Alternatively, the second catch may include a plurality of inner projections arranged in an annular array around a circumference of the seal seat, each inner projection extends radially inward from the body, and each pair of adjacent outer projections is separated by a second angular gap.

The flushometer valve may include a piston top that includes a first material, threads that threadedly coupled to the flow guide, and a bleed passage that fluidly connects a pressure chamber and the inlet chamber. The flushometer valve may include an insert, which is separate from the piston top, and includes a second material that is different than the first material. The insert may be disposed within a counterbore of the bleed passage, and the insert may have a bore that fluidly connects the bleed passage and the pressure chamber. The bore may have a minimum cross sectional size that is smaller than a minimum cross sectional size of the bleed passage. The flushometer valve may include a weld coupling the insert to the piston top. A tab/finger of the piston top may engage a recess in the insert.

The flow guide may include a first wall that extends inwardly from an inner surface of the base, and the first wall may be located generally opposite the first catch. The flow guide may include a second wall that extends longitudinally from an inner end of the first wall to define a retaining channel along with the first wall and the base. A toggle seal may be disposed and retained in the retaining channel.

At least one embodiment relates to a piston assembly for controlling operation of a flushometer valve by moving relative to a hollow body of the flushometer valve between an open position, in which an inlet chamber is fluidly connected to an outlet chamber, and a closed position, in which the inlet chamber is fluidly disconnected from the outlet chamber. The flushometer valve has a pressure chamber that is separated from the inlet and outlet chambers, such as by the piston assembly. The piston assembly includes a flow guide, a piston top, and an insert. The flow guide includes a threaded base, and the piston top includes a threaded body coupled to the threaded base and a bleed passage extending through the threaded body to fluidly connect the pressure chamber and the inlet chamber. The bleed passage has a counterbore in an end located adjacent to the pressure chamber. The insert is disposed within the counterbore of the bleed passage, and the insert has a bore that fluidly connects the bleed passage and the pressure chamber. The bore of the insert has a size that is smaller than a size of the bleed passage of the piston top.

The piston assembly may include other components. By way of example, the piston assembly may include a seal seat and a seal. The seal seat may include an annular body that is disposed around the threaded base, a notch that is disposed in an end of the annular body adjacent to the piston top so that the notch defines an inlet of the bleed passage with the piston top, and a catch that extends radially inward from the annular body and engages an outer catch of the flow guide to prevent relative motion between the flow guide and the seal seat in a longitudinal direction along which the piston assembly moves. The seal may be retained between an end of the seal seat and an outer flange of the flow guide, and the seal is configured to engage a valve seat of the flushometer valve in the closed position and disengage from the valve seat in the open position. The piston top may include a first material and the insert may include a second material that is different than the first material.

DETAILED DESCRIPTION

Referring generally to the FIGURES, disclosed herein are flushometers (e.g., flush valves, flushometer valves, etc.) for use with urinals, toilets, water closets, and other devices. It is noted that this application uses the term urinal as short hand to cover urinals, toilets, water closets, and other devices. Flushometers are configured to control the flow and amount of water through the flush valve (e.g., from an inlet to an outlet) for each flushing operation/cycle of the urinal. The flushometers are configured to pass water at a relatively high rate of flow even if the urinal is fluidly connected to a water supply having a relatively low water pressure.

Figure 1:
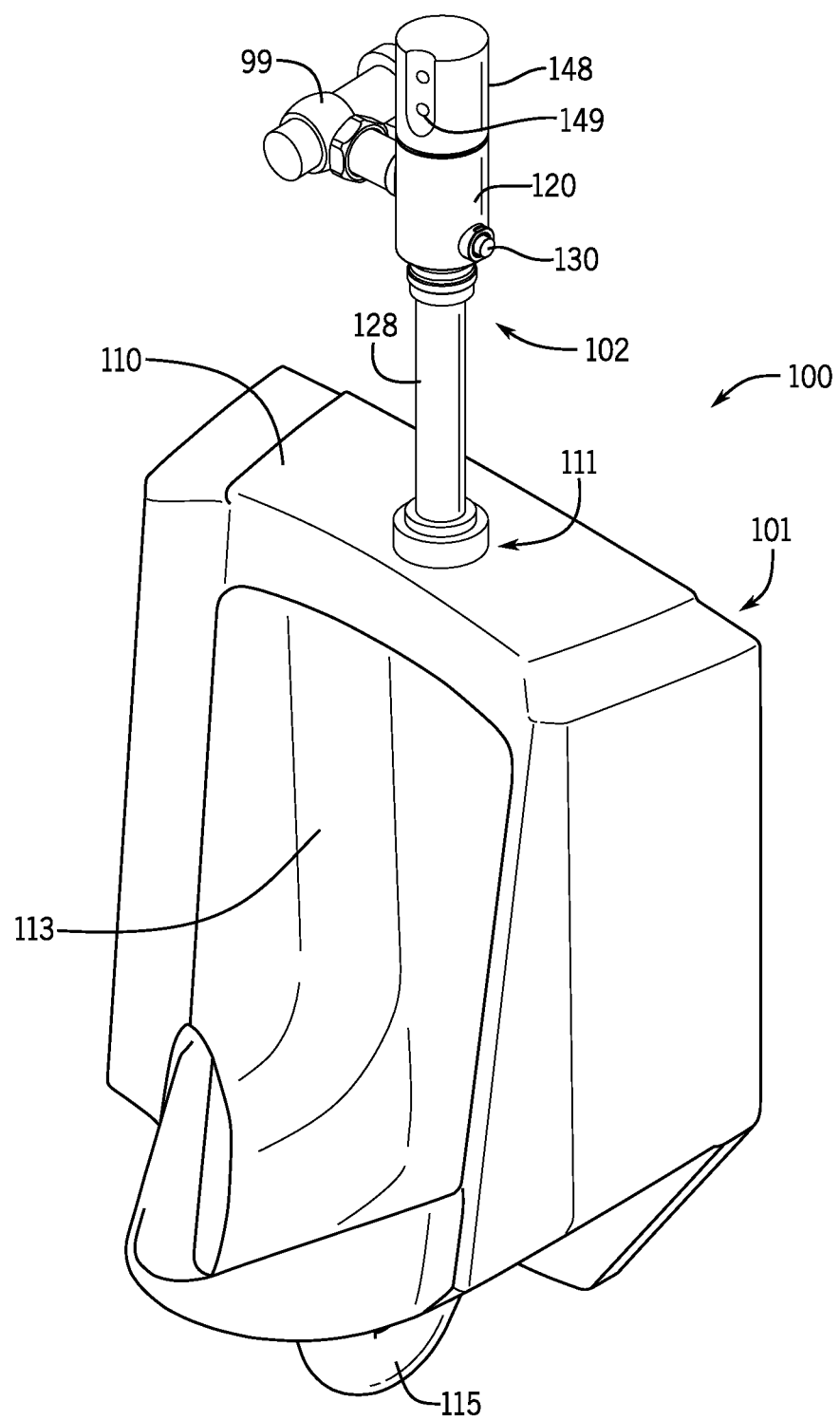
FIG. 1 is a perspective view of a urinal that is configured to include an embodiment of this application.

FIG. 1 illustrates an exemplary embodiment of a urinal assembly 100 having a urinal 101 and a flushometer 102, according to this application. The urinal 101 may be configured according to any urinal, in that it may have any suitable shape and any suitable material. By way of example, U.S. D747,447, which is assigned to Kohler Co., illustrates a urinal that can be used with the flushometer 102 to provide flush water for each flush cycle of the urinal assembly 100. The urinal 101 includes a mounting surface 110 (shown in FIG. 1 as a top surface) that is for mounting the flushometer 102 thereto, an inlet opening 111 that is fluidly connected to the flushometer 102 (e.g., an outlet chamber thereof), a wash surface 113 that receives flush water from the flushometer 102 to clean the wash surface 113 from urine, and a drain pipe 115 (e.g., trap, etc.) through which the urine and wash water are removed from the urinal 101.

Also shown in FIG. 1, the flushometer 102 is mounted to the mounting surface 110 of the urinal 101 and is fluidly connected to a water supply line 99, which introduces water into the flushometer 102. The water supply line 99 is fluidly connected to a water source (e.g., city water, a well, etc.).

Figure 2:
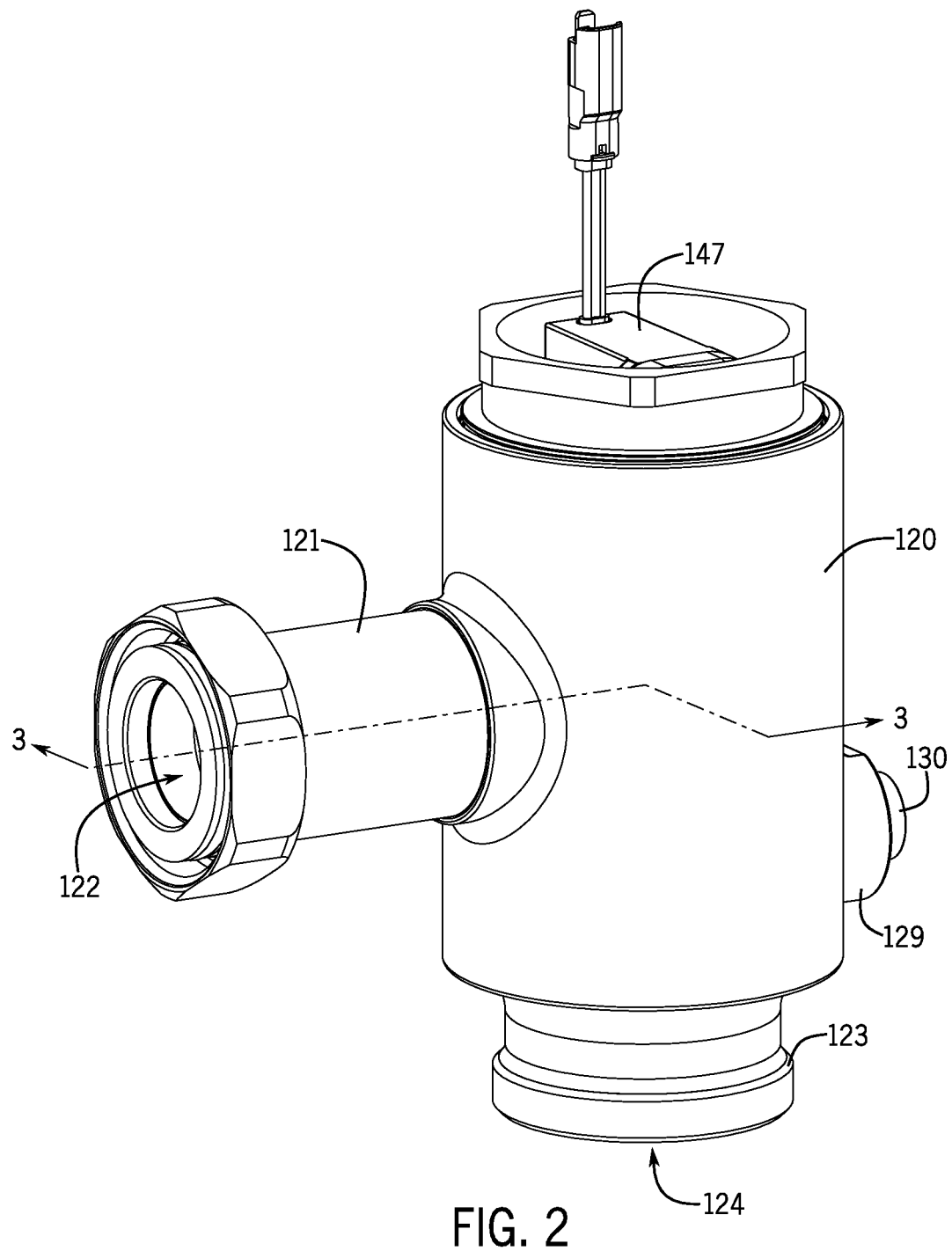
FIG. 2 is a perspective view of a flushometer, according to at least one embodiment of this application.
Figure 3:
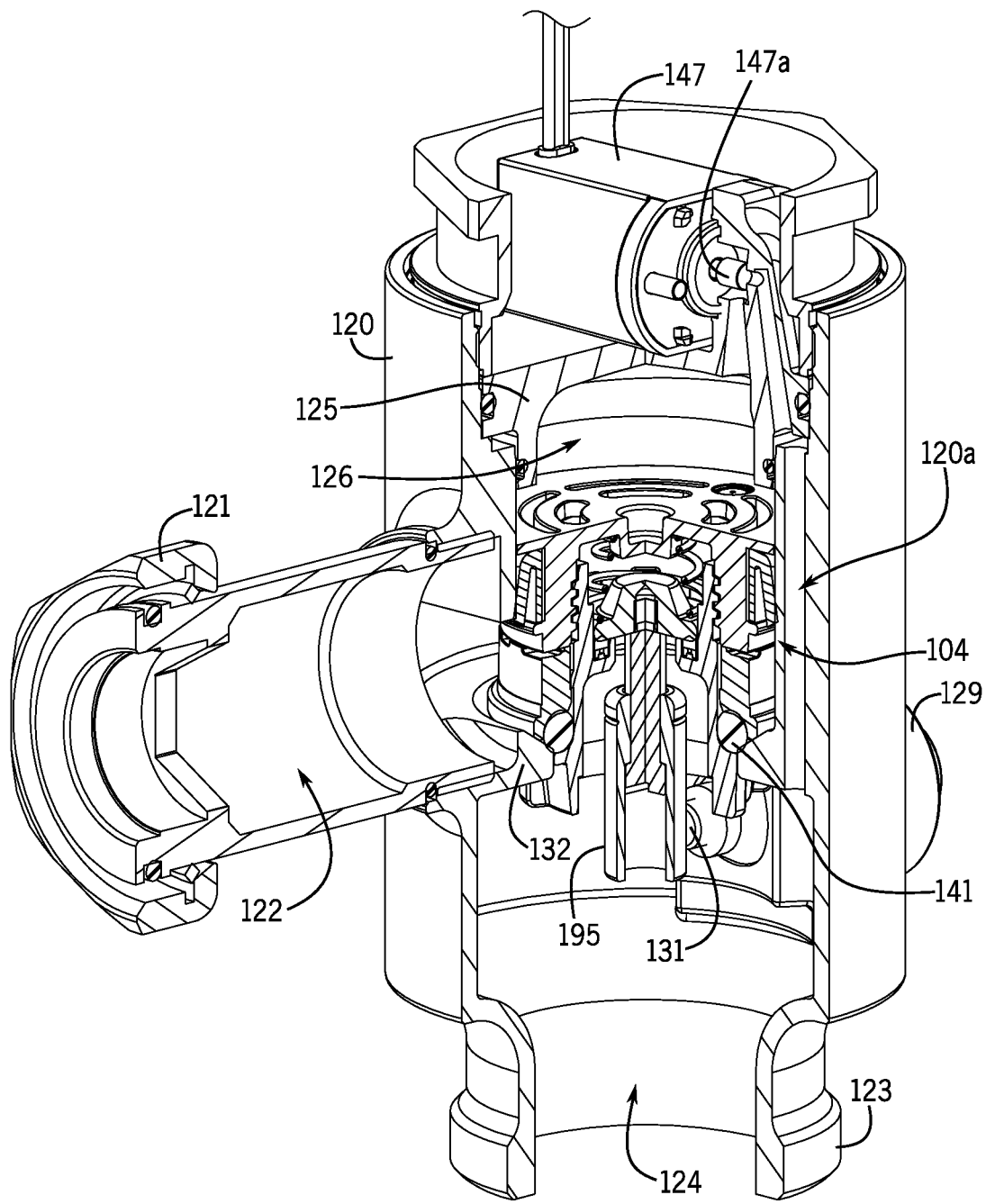
FIG. 3 is a perspective partial cutaway view of the flushometer shown in FIG. 2 in a closed position.
Figure 4:
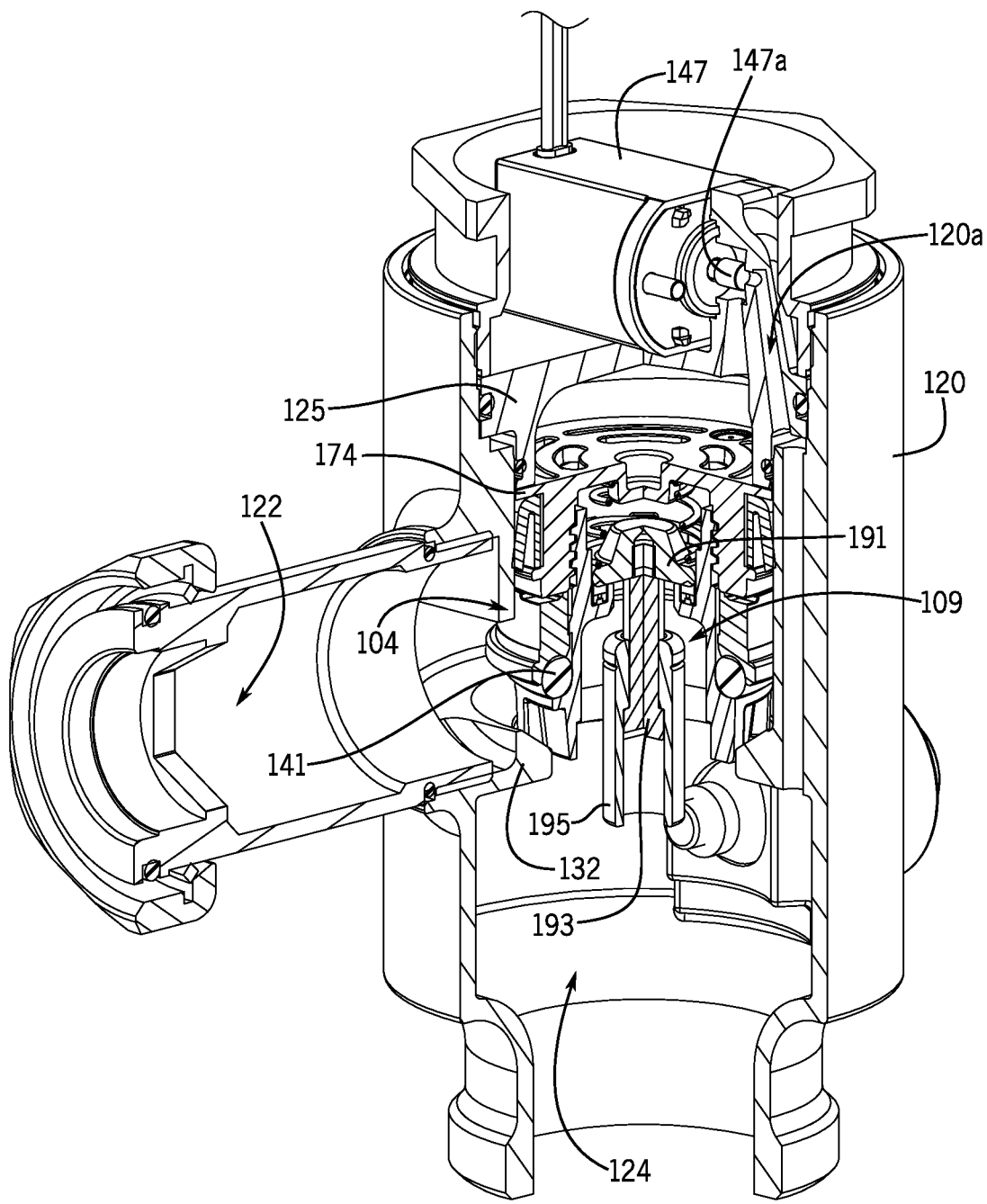
FIG. 4 is a perspective partial cutaway view of the flushometer shown in FIG. 2 in an open position.

FIGS. 2-12 illustrate an exemplary embodiment of a flushometer 102. As shown in FIGS. 2-4, the flushometer 102 includes a hollow valve body 120 and a piston assembly 104 movably disposed in the hollow valve body 120 for controlling operation of the flushometer 102.

The valve body 120 includes an inlet connection 121 defining an inlet chamber 122 (e.g., with the piston assembly 104), an outlet connection 123 defining an outlet chamber 124 (e.g., with the piston assembly 104), and a top member 125 defining a pressure (e.g., upper) chamber 126 (e.g., with the piston assembly 104). As shown in FIGS. 2-4, the inlet connection 121 includes an inlet pipe that is configured to be fluidly connected to the water supply line 99 (shown in FIG. 1), and a locking feature, such as a locking nut, may secure the water supply line 99 and the inlet connection 121 in place. The outlet connection 123 can be connected directly to the urinal 101 (e.g., the inlet opening 111 and/or mounting surface 110) or may be fluidly connected to the urinal 101 through one or more other members, such as the connecting pipe 128 shown in FIG. 1. A locking nut or other locking feature may secure the outlet connection 123 to the urinal 101 (or the inlet of the connecting pipe 128 if provided). Similarly, a locking nut or other locking feature may secure the outlet of the connecting pipe 128 to the urinal 101, if the connecting pipe 128 is provided.

The valve body 120 may include an actuator connection 129 for housing an actuator 130 having a plunger 131, which may be configured to contact a component (e.g., the slider)

of the piston assembly 104. The plunger 131 may be configured to control an operation of the flushometer 102, such as by moving another component. For example, the actuator 130 may be configured to move the plunger 131 in a radial direction (e.g., inwardly/outwardly relative to the longitudinal axis LA), such as to move the slider 195 the toggle and spring assembly 109 of the piston assembly 104. The plunger 131, upon actuation, can be configured to tilt the slider 195 to move the toggle and spring assembly 109 to bleed water from the pressure chamber to the outlet chamber through an opening in the piston assembly (e.g., through the hole(s) 176 in the piston top 107 to the cavity between the piston top 107 and flow guide 105, then through an opened gap between the moved toggle plate 191 and the second interior wall 158).

FIGS. 5-12 illustrate an exemplary embodiment of a piston assembly 104 for use with the flushometer 102. The piston assembly 104 is disposed inside of the hollow valve body 120 and is movable relative to the hollow valve body 120 between an open position (shown in FIG. 4), in which the outlet chamber 124 is fluidly connected to the inlet chamber 122, and a closed position (shown in FIG. 3), in which the outlet chamber 124 is fluidly disconnected from the inlet chamber 122. As shown in FIG. 3, in the closed position, a seal 141 of the piston assembly 104 engages a valve seat 132 of the valve body 120 to fluidly disconnect the inlet chamber 122 and the outlet chamber 124. As shown in FIG. 4, in the open position, the seal 141 of the piston assembly 104 is disengaged and offset from the valve seat 132 by a gap defining a fluid passage for water to flow from the inlet chamber 122 to the outlet chamber 124.

Figure 5:
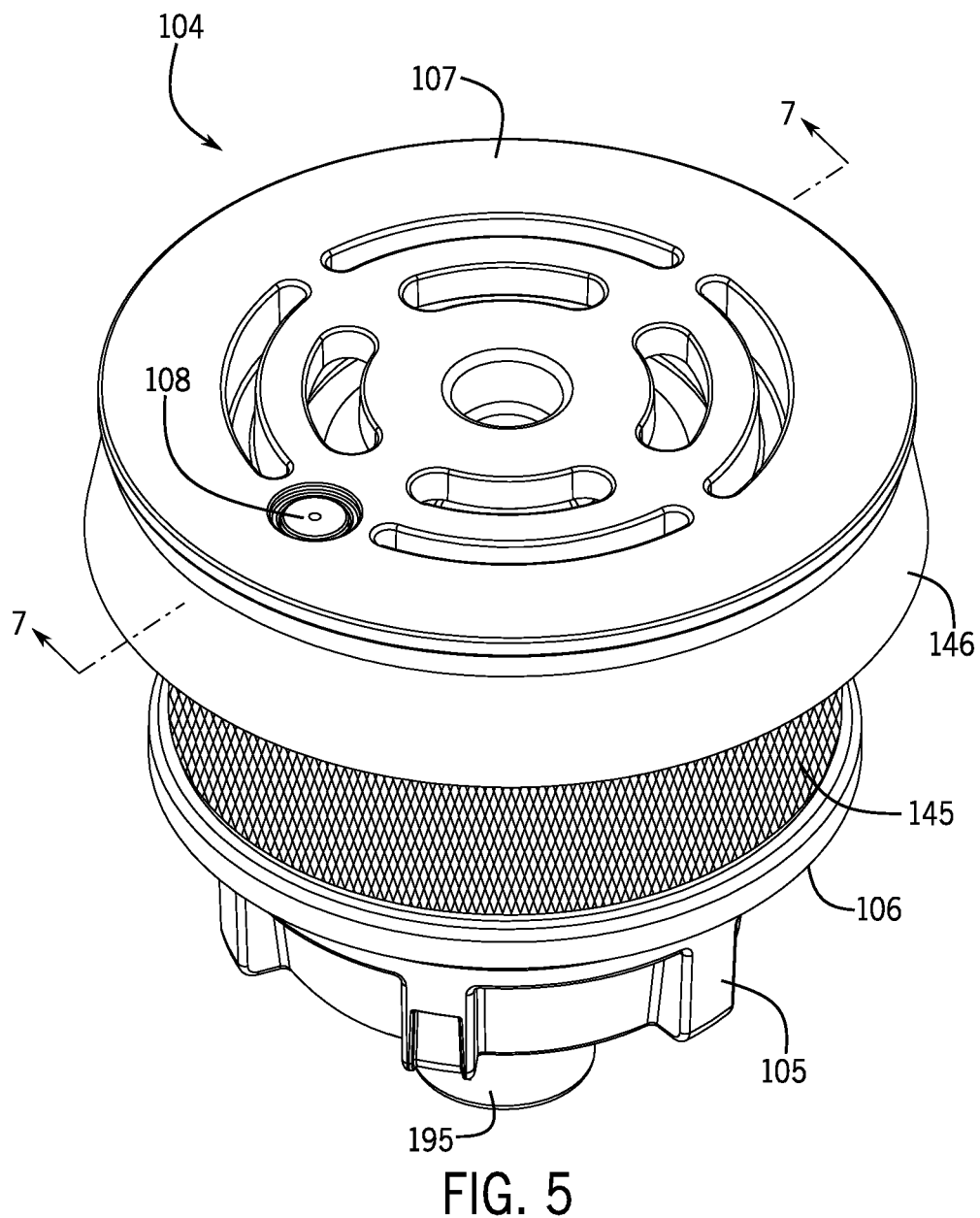
FIG. 5 is a perspective view of a piston assembly for use with a flushometer, according to at least one embodiment of this application.
Figure 6:
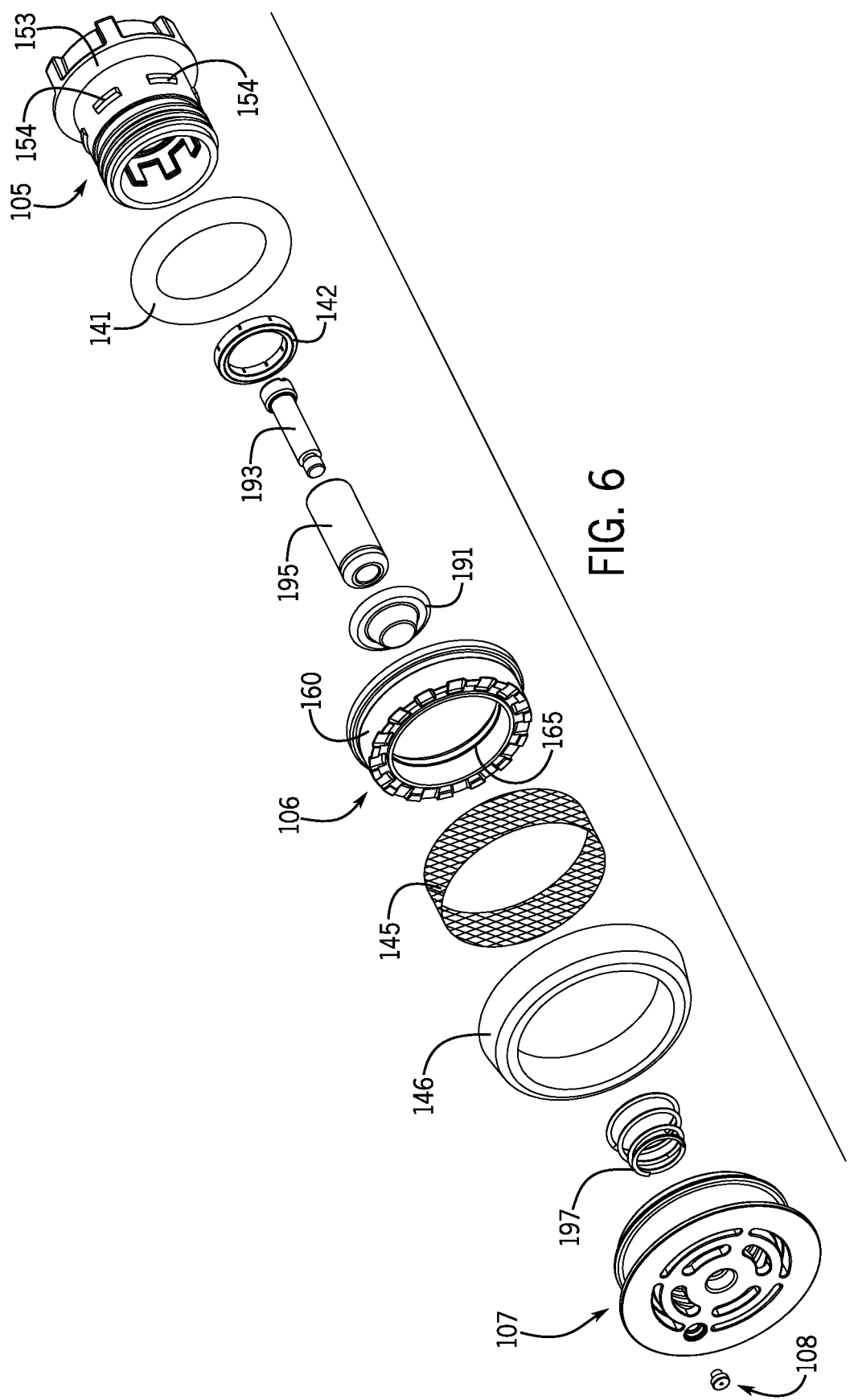
FIG. 6 is an exploded view of the piston assembly shown in FIG. 5.

As shown in FIGS. 5 and 6, the piston assembly 104 includes a flow guide 105, a seal seat 106, a piston top 107, and an insert 108. The flow guide 105, the seal seat 106, and the piston top 107 move together relative to the valve body 120 as the piston assembly 104 moves between the open and closed positions. A seal 141 (e.g., first seal) may be disposed between the seal seat 106 and the flow guide 105 to engage the valve seat 132 of the valve body 120 in the closed position.

Figure 7:
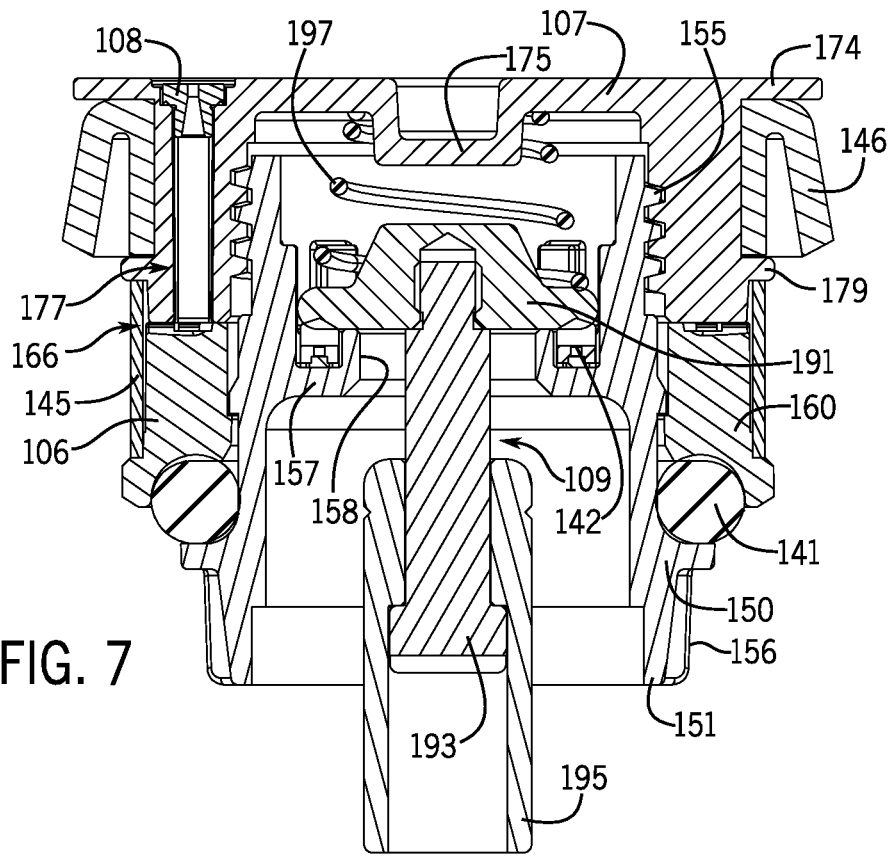
FIG. 7 is a front cross-sectional view of piston assembly shown in FIG. 5.
Figure 9:
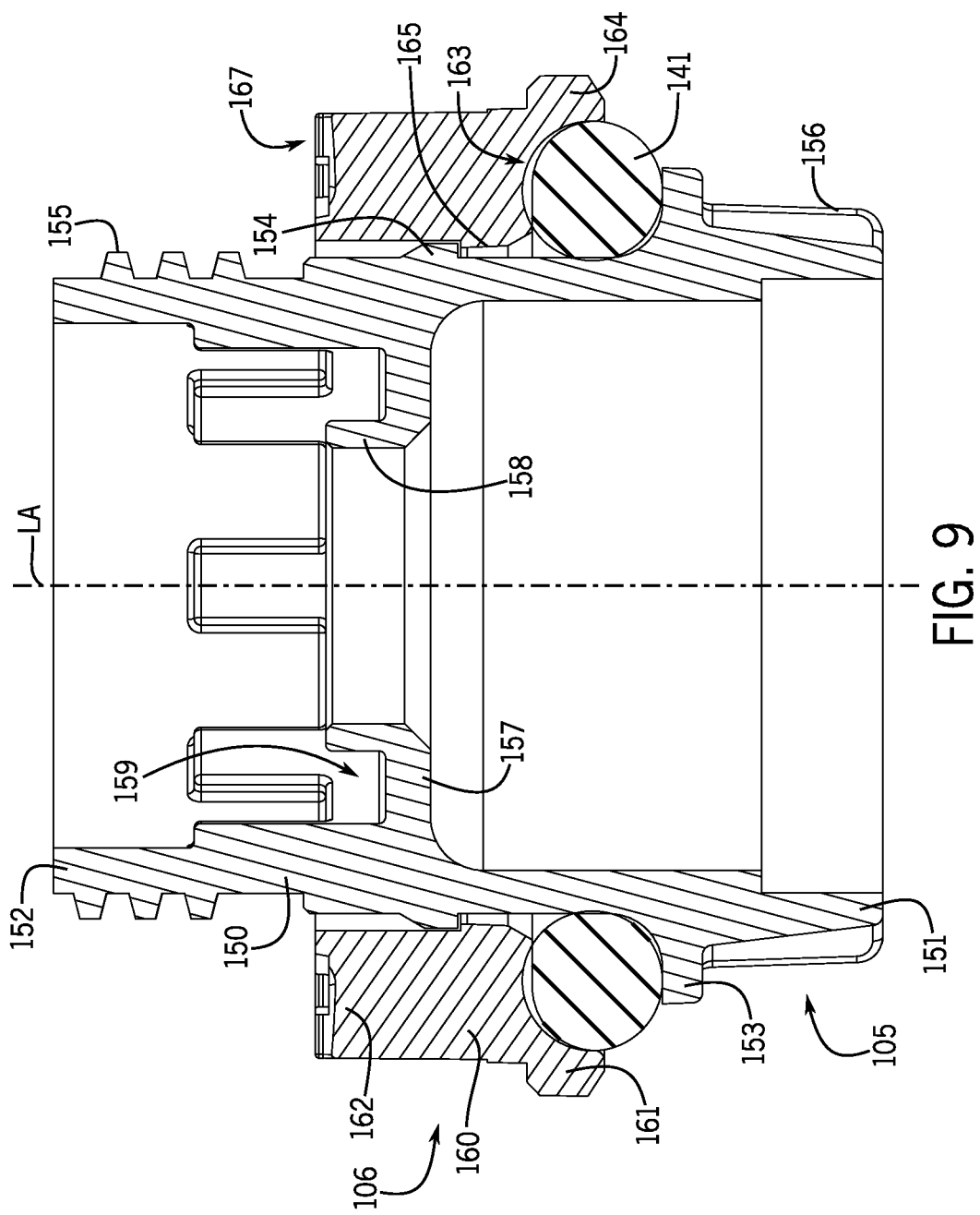
FIG. 9 is a front cross-sectional view of the flow guide, seal seat and seal shown in FIG. 8.

As shown best in FIG. 9, the flow guide 105 includes a generally annular base 150 that extends longitudinally (e.g., in a longitudinal direction LA) between a first end 151 (shown as the bottom end) and a second end 152 (shown as the top end). The annular base 150 defines a hollow interior that is configured to receive other components of the piston assembly 104 (as shown in FIG. 7 and described below).

The flow guide 105 includes a flange 153 that extends radially outward from an exterior (e.g., outer) surface of the base 150 for supporting and retaining the seal 141. As shown in FIGS. 6 and 9, the flange 153 extends around a circumference of the base 150 in a continuous (e.g., uninterrupted) manner to support the seal 141 around the entire circumference. Thus, the flange 153 as shown is a single annular element. According to other examples, the flange 153 may be discontinuous, such as having one or more interruptions around the circumference of the base 150. Thus, the flange 153 can be a series of semi-annular elements spaced apart angularly around the base 150. The flange 153 may have a curved (e.g., arcuate) profile (e.g., in the cross-section shown in FIG. 9) that is configured to receive the seal 141. For example, the curved profile may complement the external shape of the seal 141 to better retain the seal 141 in place.

The flow guide 105 includes a catch 154 that is offset longitudinally from the flange 153 and extends radially outward from the exterior surface of base 150. Thus, the catch 154 and the flange 153 are spaced apart by a gap, such as to receive the seal 141 and a portion of the seal seat 106. As shown in FIG. 6, a plurality of catches 154, which may be configured as a plurality of outer projections, are arranged in an annular array around a circumference of the base 150 of the flow guide 105, with each outer projection extending radially outward from the base and each pair of adjacent outer projections being separated by an angular gap/spacing. Alternatively, a single annular catch may extend around the entire circumference of the base 150. Each catch 154 (e.g., outer projection) extends outward beyond the adjacent sections of the base 150 to allow the catch 154 to engage a catch of the seal seat 106 (discussed more below).

The flow guide 105 may include other features. For example, the second end 152 of the flow guide 105 may include threads 155 for coupling the flow guide 105 and the piston top 107 through a threaded coupling, as shown in FIGS. 7 and 9. As another example, the first end 151 of the flow guide 105 may include one or more flutes 156 that are spaced apart at different radial locations relative to the longitudinal axis LA. Each flute 156 extends radially outward from the exterior surface of the base 150/first end 151, and each flute 156 extends longitudinally from the flange 153 to the edge of the first end 151. As shown in FIG. 4, water can pass between the flutes 156 from the inlet chamber 122 to the outlet chamber 124 when the flushometer is open.

As shown best in FIGS. 7 and 9, the flow guide 105 may also include a first interior wall 157 that extends radially inwardly from an inner surface of the base 150 and a second interior wall 158 extending longitudinally from an inner end of the first interior wall 157 to define a retaining channel 159 along with the first interior wall 157 and the base 150. As shown in FIG. 7, a seal 142 is disposed and retained in the retaining channel 159 by the flow guide 105. The first interior wall 157 may be generally opposite the catch 154 of the flow guide 105.

The seal seat 106 includes a generally annular body 160, which is disposed around the base 150 of the flow guide 105 when assembled. The body 160 extends longitudinally (e.g., in the longitudinal direction LA shown in FIG. 9) between a first end 161 (shown as the bottom end) and a second end 162 (shown as the top end). Disposed at the first end 161 is a recess 163 that is configured to receive and retain (e.g., secure) the seal 141 between the flow guide 105 and the seal seat 106. As shown in FIG. 9, the recess 163 is inwardly curved (e.g., concave) with a shape that generally complements the external shape of the seal 141. Also disposed at the first end 161 is a retaining ring 164 having an annular shape that extends around the first end 161 and helps define the recess 163. The retaining ring 164 of the seal seat 106 and flange 153 of the flow guide 105 retain the seal 141 in place in the recess 163 and against the flow guide 105. As shown, the retaining ring 164 projects radially outward beyond the outside of the body 160. This arrangement may allow the outside of the retaining ring 164 (e.g., radially) to contact an inside of the valve body 120, which may help guide movement of the piston assembly 104 relative to the valve body 120.

The seal seat 106 includes a catch 165 (e.g., a second catch) that extends radially inward from the body 160 and engages the catch 154 of the flow guide 105 to limit travel (e.g., limit or prevent relative longitudinal motion) between the flow guide 105 and the seal seat 106 (e.g., relative motion along the longitudinal axis LA). For example, when the catch 165 contacts the catch 154, the seat seal 106 cannot move upward along the longitudinal axis LA (as viewed in FIG. 9) relative to the flow guide 105, since the catches 165, 154 prevent such relative motion. The seat seal 106 could move downward along the longitudinal axis LA relative to the flow guide 105 absent the other components of the piston assembly 104 (e.g., the seal 141). For example, the seal 141 may be used to limit a downward travel along the longitudinal axis LA of the seat seal 106 relative to the flow guide 105. The seal 141 may be compliant (e.g., include a compliant material), and the seal 141 may be retained between the seal seat 106 and the flow guide 105 in a compressed state to impart a biasing force between the two catches 165, 154. That is, the biasing force may bias the two catches 165, 154 toward one another into a locking position.

As shown in FIG. 6, the catch 165 of the seal seat 106 is configured as a single continuous annular inner projection that extends radially inwardly from the body 160. The single continuous projection can extend around the entire circumference of the body 160. According to other embodiments, the catch 165 includes a plurality of inner projections arranged in an annular array around the circumference of the seal seat 106 (e.g., the body 160) with each inner projection of the catch 165 extending radially inward from the body 160. Each pair of adjacent inner projections of the catch 165 is separated by an angular gap. For example, each inner projection of the catch 165 of the seal seat 106 may align with an associated outer projection of the catch 154 of the flow guide 105, and each gap between the inner projections may align with an associated gap between the outer projections. It is advantageous to have one of the catches 165, 154 as a single continuous projection and the other catch 165, 154 as a plurality of separated projections, because this arrangement reduces the installation force required to assemble (e.g., install) the flow guide 105 and the seal seat 106 together compared to having two single continuous projections, while making it easier to assemble them together by avoiding having to align the projections of the flow guide with the projections of the seal seat, such as if both parts have a plurality of separated projections.

The catches 165, 154 of the seal seat 106 and flow guide 105 are configured to advantageously improve assembly and act as a failsafe in the event of a failure. For example, during assembly, the catches 165, 154 help retain the seal seat 106 in place on the flow guide 105 until the piston top 107 can be threaded onto the flow guide 105 to sandwich the seal seat 106 between the flow guide 105 and the piston top 107. The seal 141 may be disposed between the seal seat 106 and the flow guide 105 and may apply the biasing force discussed above. Also, the catches 165, 154 provide a failsafe in the event that, for example, the piston top cracks (e.g., from overloading during use). A cracked piston top typically results in continuous flushing of the flushometer valve, which wastes water until repaired. The catches 165, 154 are configured to close off the valve and prevent continuous flushing (e.g., in the event the piston top is damaged/cracked), such as until the piston assembly can be replaced.

Figure 8:
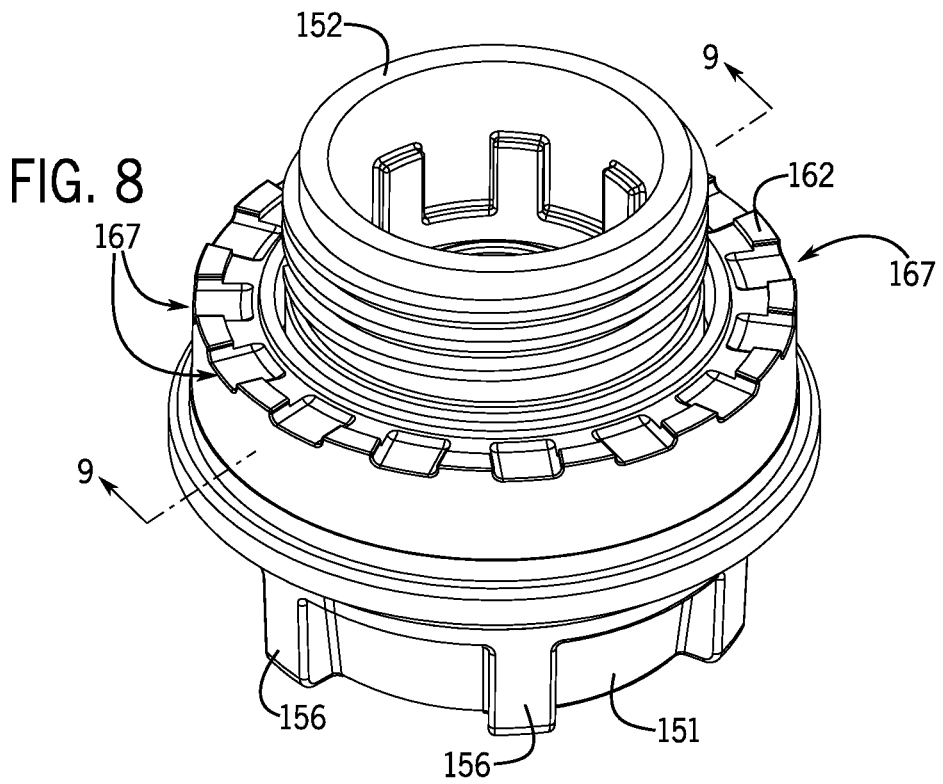
FIG. 8 is a perspective view of a flow guide, seal seat and seal for use with a piston assembly, according to at least one embodiment of this application.

The seal seat 106 may include a bleed passage 166 that fluidly connects the inlet chamber 122 to the pressure chamber 126 either directly or indirectly. The bleed passage 166 of the seal seat 106 (shown in FIG. 7) fluidly connects the inlet chamber 122 to a bleed passage 177 of the piston top 107 (discussed below), which is fluidly connected to the pressure chamber 126 (shown in FIG. 3). As shown in FIG. 8, each bleed passage 166 is formed by one of the notches 167 cut from the second end 162 of the seal seat 106. The bleed passage 177 of the piston top 107 can be aligned with one notch 167 (e.g., to be fluidly connected) when the piston top 107, the flow guide 105 and the seal seat 106 are coupled together. In this arrangement, the bleed passage 166 is defined by a bottom surface of the piston top 107 together with the surfaces of the seal seat 106 defining the notch 167. An annular channel may be provided between the outer top projections forming the second end 162 of the seal seat 106 and the annular base 150 of the flow guide 105, and the channel may be fluidly connected to each notch 167. In this way, the bleed passage 177 can be fluidly connected to all of the notches 167 when the piston top 107 and the flow guide 105 are assembled, and the flushometer operates effectively no matter the relative alignment between the components (e.g., between the bleed passage 177 and the inlet chamber 122, the piston top 107 and the flow guide 105 and/or the valve body 120, etc.). The bleed passage 177 could be formed solely in the piston top 107, such as by having the inlet pass through a portion of the body 170. However, the location of the inlet of the bleed passage relative to the inlet chamber influences the performance of the flushing with this arrangement, so components may need to be aligned in a specific way to achieve desired performance. In contrast, the arrangement shown in FIGS. 7 and 8 provides repeatable performance regardless of the relative alignment of the components (e.g., the bleed passage 177 and the inlet chamber 122). Another advantage of the arrangement shown is that the size of the notches and, therefore, the size of the inlet of the bleed passage 177 can be designed to be large enough to not clog (e.g., with minerals) even if the seal seat 106 includes a glass filler.

Figure 10:
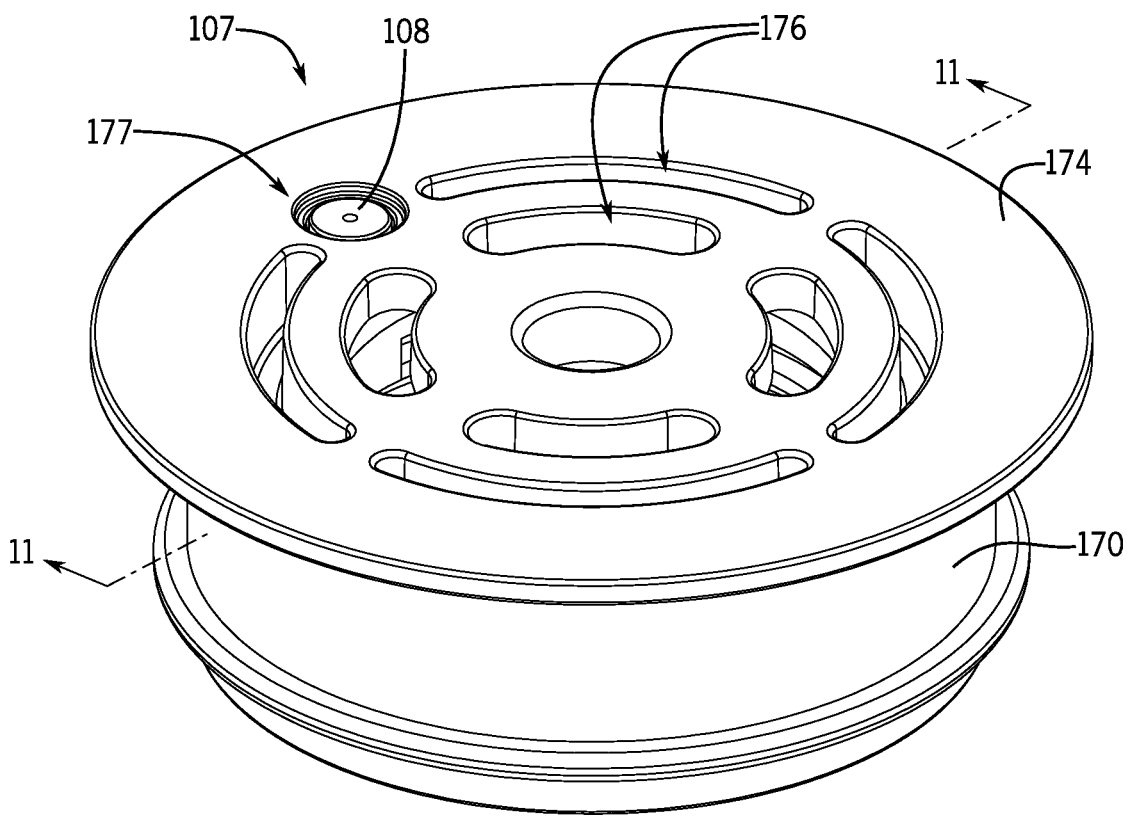
FIG. 10 is a perspective view of a piston top and an insert for use with a piston assembly, according to at least one embodiment of this application.
Figure 11:
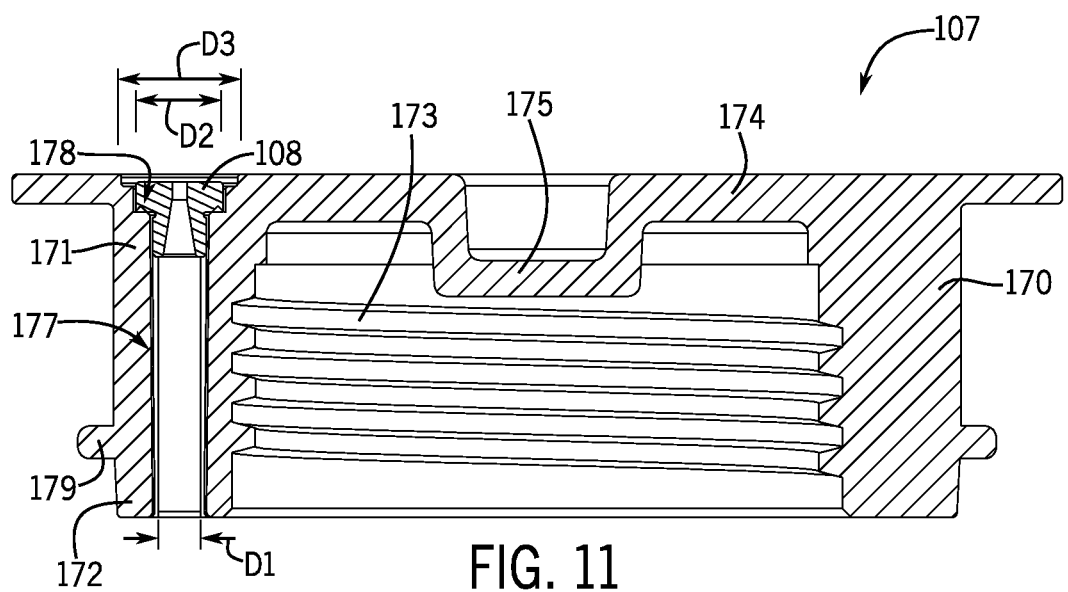
FIG. 11 is a front cross-sectional view of the piston top and the insert shown in FIG. 10.
Figure 12:
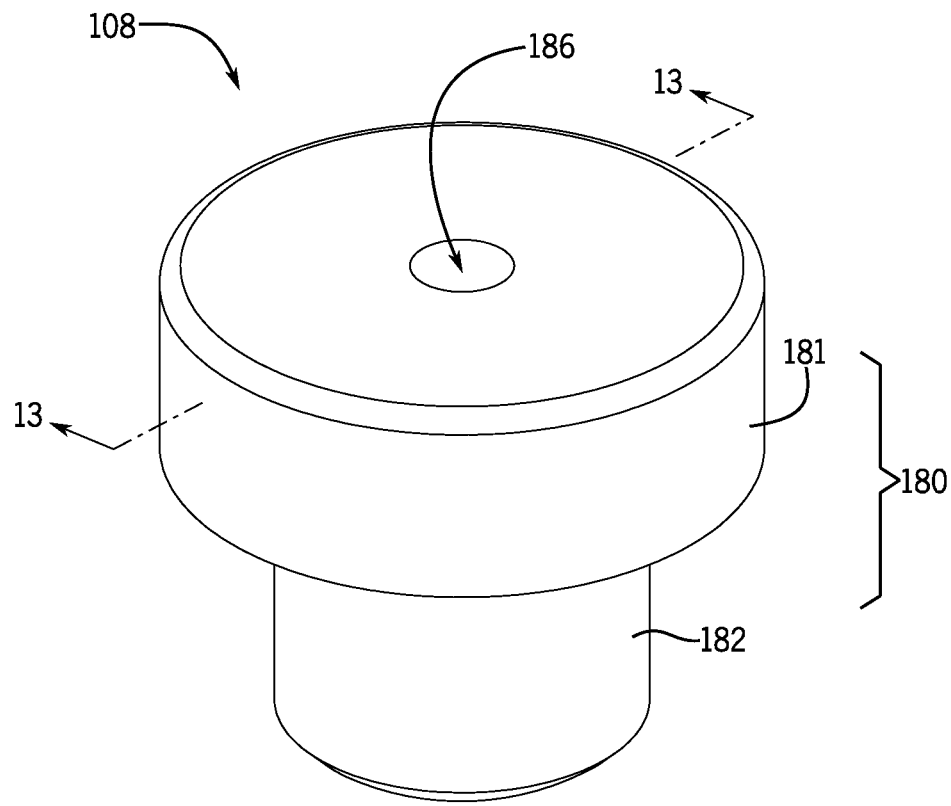
FIG. 12 is a perspective view of an insert for use with a piston assembly, according to at least one embodiment of this application.

As shown best in FIGS. 10 and 11, the piston top 107 includes an annular body 170 that extends between a first end 171 (shown in FIG. 11 as the top) and a second end 172 (shown in FIG. 11 as the bottom). Disposed along an inner surface of the body 170 are threads 173 for coupling the piston top 107 to the flow guide 105 (e.g., the threads 173 of the piston top 107 thread to the threads 155 of the flow guide 105). Disposed at the first end 171 is a top member 174, which extends outwardly beyond the outer edge of the body 170. An outer surface (e.g., diameter) of the top member 174 is sized to complement the inner surface (e.g., diameter) of the portion of the hollow valve body 120 defining the pressure chamber 126, such that as the piston assembly 104 slides in the valve body 120, the outer surface of the top member 174 moves along and is supported by the inner surface of the valve body 120. As shown in FIG. 4, the top member 125 of the valve body 120 is configured to act as a travel stop to limit travel of the piston assembly 104 upon contact of the top member 125 by the top member 174 of the piston top 107. Extending downwardly (as shown in FIG. 11) from the top member 174 is a protrusion 175 having a cup shape. The protrusion 175, if provided, is configured to help retain a spring of the toggle and spring assembly 109 (discussed more below). The top member 174 may include one or more holes 176 disposed therein, such as for venting or fluid flow. The holes 176 may have any suitable shape (e.g., circular, oval, kidney-shaped, elongated, etc.).

The piston top 107 includes a bleed passage 177 that is configured to fluidly connect the pressure chamber 126 and the inlet chamber 122, either directly or indirectly (e.g., with the bleed passage 166 of the seal seat 106). As shown in FIGS. 10 and 11, the bleed passage 177 of the piston top 107 is a bore that extends through the body 170 (e.g., from a top edge to a bottom edge). Disposed at the top of the bleed passage 177 (see FIG. 11) is a counterbore 178 that is configured to receive at least a portion of the insert 108 (discussed more below). The counterbore 178 includes one or more shoulders (e.g., defined by the body 170), with each shoulder having a larger size (e.g., diameter than the preceding or lower shoulder). As shown in FIG. 11, the bore of the bleed passage 177 has a diameter D1, a first shoulder of the counterbore 178 has a diameter D2, which is larger than the diameter D1, and a second shoulder of the counterbore 178 that is above the first shoulder has a diameter D3, which is larger than the diameter D2. In this way, the insert 108 is supported by the shoulders of the counterbore 178 in the bleed passage 177 of the piston top 107.

As shown best in FIGS. 10 and 11, the insert 108 is disposed within the bleed passage 177 of the piston top 107, such as the counterbore 178. As shown best in FIGS. 12 and 13, the insert 108 includes a body 180 having a first part 181 (e.g., a base, which is shown as the top part) and a second part 182 (e.g., a shoulder, which is shown as the bottom part) connected with the first part 181. The first part 181 has a larger size (e.g., outer diameter) compared to the size (e.g., outer diameter) of the second part 182 to allow the insert 108 to fit within and complement the shape of the counterbore 178. As shown, each of the first and second parts 181, 182 is a generally cylindrical element. The first part 181 is disposed in the counterbore 178 of the piston top 107, and the second part 182 extends away from the first part 181 and is disposed in the bleed passage 177 of the piston top 107.

Figure 13:
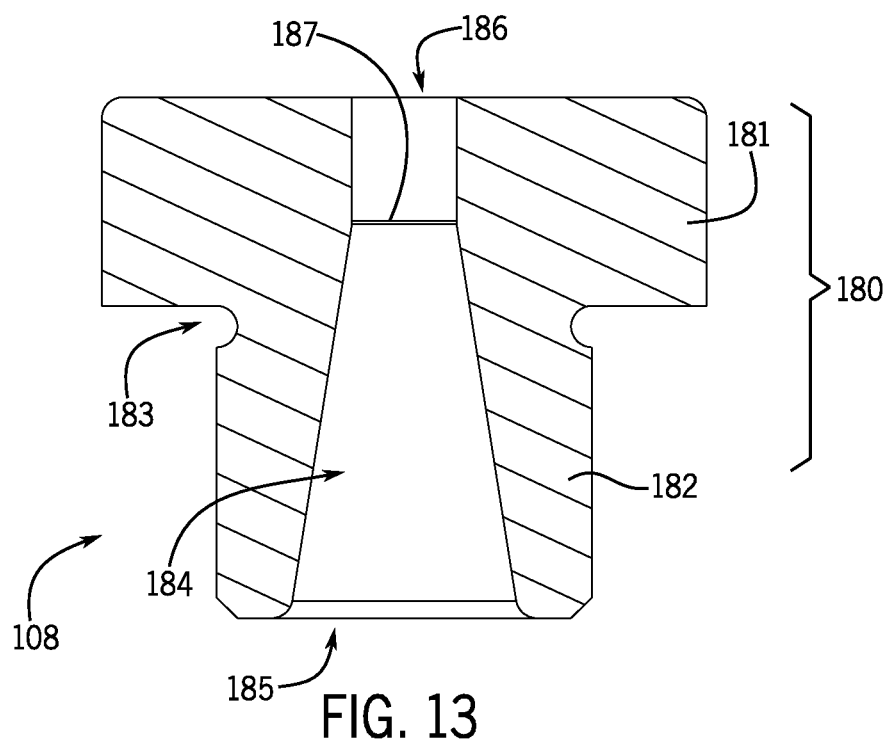
FIG. 13 is a front cross-sectional view of the insert shown in FIG. 12.

A recess 183 is undercut (e.g., forming a notch, channel, etc.) in the second part 182 in an end adjacent the first part 181. As shown in FIG. 13, the undercut recess 183 has a concave shape (e.g., C-shape). However, the recess 183 can have other shapes (e.g., V-shaped, square/rectangular shaped, etc.) so long as the recess undercuts the second part 182. The recess 183 is configured to receive a finger (e.g., tab, projection, annular extension, etc.) of the body 170 of the piston top 107, where the finger extends into the counterbore 178. The finger of the body 170 may have a shape that complements the shape of the recess 183 (e.g., C-shaped, V-shaped, etc.), so that the finger engages the recess to help retain the insert 108 in the counterbore 178 and bleed passage 177 of the piston top 107. The finger can be formed in the piston top 107 prior to assembly (e.g., the finger can be made with the piston top) so that the finger acts as a detent (e.g., the insert 108 can snap into place with the piston top 107), or the finger can be formed after assembly. For example, insert 108 and the piston top 107 can be welded (e.g., ultrasonically) together, such that the finger is formed during welding to engage the recess 183. Thus, the finger and recess 183 can form a joint (e.g., a weld joint, a weld, etc.) that secures the insert 108 to the piston top 107.

The insert 108 includes a bore 184 that fluidly connects the bleed passage 177 of the piston top 107 and the pressure chamber 126 (when coupled to the piston top 107). The size of the bore 184 is designed to fill the pressure chamber within a threshold time. That is the bleed passage/bore control the rate at which the pressure chamber is refilled. The bore 184 may have a substantially uniform size (e.g., cross-sectional size) through the insert 108. As shown in FIG. 13, the bore 184 has a non-uniform size through the insert 108, with an inlet 185 having a size (e.g., diameter), which is smaller than the size of the bleed passage 177 of the piston top 107, and an outlet 186 having a size, which is smaller than the size of the inlet 185. For example, the bore 184 may have an inlet section that narrows in diameter (e.g., tapers) moving from the inlet 185 toward the outlet 186, wherein the inlet section defines a venturi 187 within the bore 184. The venturi 187 has a smaller size than the inlet section to constrict the flow of fluid through the bore 184 to increase the velocity of fluid in the narrower section(s). The inlet section (e.g., from the inlet 185 to the venturi 187) may have a generally frusto-conical shape and the outlet section (e.g., from the venturi 187 to the outlet 186) may have a generally cylindrical shape.

One advantage of separating the insert 108 and the piston top 107 into two separate parts/elements (of the piston assembly 104) to form the bleed passage/hole is that this arrangement allows for the use of dissimilar materials between the insert 108 and the piston top 107. Due to the relative small size of the bleed passages/bore 184, such as at the venturi 187, the bore/bleed passages are prone to clogging from material build up (e.g., minerals) therein. Another problem common to piston-type flushometers is the lack of durability of the components of the piston assembly due to the large number of cycles that each urinal must provide. The piston assembly 104 address both problems by having the insert 108, which includes a first material designed to resist material build up in the bore while providing excellent hydrolytic and dimensional stability, separate from the piston top 107, which includes a second material designed to increase durability/longevity of the assembly. Thus, the benefits of the piston assembly 104 are improved performance, increased longevity of the piston top and bleed passage (e.g., the bleed hole orifice), and resistance to mineral build up.

Accordingly, the piston top 107 includes a first material and the insert 108 includes a second material that is different than the first material. For example, the piston top 107 may be made from the first material, and the insert 108 may be made from the second material.

According to at least one embodiment, the first material of the piston top 107 is a polymer having a glass filler. By way of non-limiting examples, the first material may be or include a Noryl™ resin GFN3 (which typically has about 30% glass filler), a Grivory GV-5H (which typically includes 20-60% glass filler or fiber reinforcement), a Ticona Fortron® 1140 (which typically has about 40% glass filler), other similar materials or any combination thereof. These materials are relatively tough and strong to increase the strength and durability of the components having these materials.

According to at least one embodiment, the second material of the insert 108 includes a polyphenylene and/or a polystyrene. An exemplary embodiment of the second material is a Noryl™ (e.g., an amorphous blend of polyphenylene oxide (PPO), polyphenylene ether (PPE) resin, and/or polystyrene) having no glass filler/fiber or a reduced amount of glass filler/fiber compared to the first material. Other non-limiting examples of the second material are 300 series stainless steels/alloys, C37700 copper alloys (e.g., brass), and Celcon®. The second material, such as the examples noted above, is configured to advantageously provide relative heat resistance, excellent hydrolytic stability, excellent dimensional stability, and low density, while being relatively easy to process (e.g., machine, mold, form, etc.).

Minerals and other elements in water tend to attach to reinforcing (e.g., glass) fibers, especially such fibers at the surface, resulting in mineral build up on the part(s). Such build up leads to a degradation in performance and possibly clogging of relatively small orifices/openings/holes (e.g., those the size of the bore 184). Using materials without reinforcing fibers, like glass, for parts (e.g., the insert 108) having relatively small orifices/openings/holes advantageously improves durability (e.g., longevity) and performance by reducing/eliminating mineral build up.

The piston assembly 104 may include other components. Also shown in FIGS. 6 and 7, the piston assembly 104 includes a toggle and spring assembly 109 having a toggle plate 191, a pin 193, a slider 195, and a spring 197. The toggle plate 191 is disposed in an upper cavity of the flow guide 105 between the first interior wall 157 of the flow guide 105 and the piston top 107. The toggle plate 191 can move up and down (as shown in FIG. 7) relative to the flow guide 105 within the upper cavity of the flow guide 105. The toggle plate 191 is hat shaped, having an annular base and a centrally located frusto-conical extension that extends from the base toward the piston top 107. An opening is disposed in an underside of the base of the toggle plate 191 to receive an end of the pin 193 to couple the toggle plate 191 and pin 193 together.

The spring 197 is disposed between the toggle plate 191 and the piston top 107. As shown in FIGS. 6 and 7, the spring 197 is a frusto-conical shaped coil spring that coils around the protrusion 175 of the piston top 107 to retain the spring 197 in place. The spring 197 imparts a biasing force between the piston top 107 and the toggle plate 191 that acts to separate these parts and acts to move the toggle plate 191 into engagement with the second interior wall 158 of the flow guide 105. According to other embodiments, a cylindrical shaped coil spring is used. However, it has been found that the frusto-conical shaped spring 197 advantageously performs better in resisting tilting and buckling during use.

The pin 193 is an elongated generally cylindrical member having an upper end, which engages the opening in the toggle plate 191, and a lower end, which retains the slider 195. The pin 193 includes a central portion between the upper and lower ends. As shown in FIG. 7, the lower end has a larger size (e.g., diameter) compared to the central portion to retain the slider 195, and the upper end has a smaller size compared to the central portion to engage the opening in the toggle plate 191.

The slider 195 is a generally cylindrical member having a central bore that receives the pin 193. As shown in FIG. 7, the central bore has an upper section, which receives and slides along the central portion of the pin 193, and a lower section, which has a larger size compared to the upper section to receive and retain the lower end of the pin 193. The slider 195 may slide relative to or with the pin 193 during operation.

A seal 142 (e.g., second seal, toggle seal, etc.) may be disposed in the retaining channel 159 of the flow guide 105 (FIGS. 7 and 9). A bottom side, inner side and/or outer side of the seal 142 seals against the flow guide 105, while a top side of the seal 142 selectively seals against toggle plate 191.

Another seal 146 (e.g., third seal, U-seal, etc.) may be disposed between the piston assembly 104 and the valve body 120. As shown in FIG. 7, the seal 146, if provided, is retained between the top member 174 and a flange 179 of the piston top 107, and the seal 146 has a generally inverted V-shape or U-shape. The flange 179 is offset from the top member 174 in the longitudinal direction by a spacing corresponding to a height of the seal 146, and the flange 179 extends radially outward from the body 170. An inner leg of the seal 146 is adjacent to (e.g., abut, contact, etc.) the piston top 107, and an outer leg of the seal 146 is configured to be adjacent to (e.g., abut, contact, etc.) the inner surface of the hollow valve body 120. The seal 146 can be configured to snap into place between the top member 174 and a flange 179 of the piston top 107. The seal 146 prohibits water from passing between the seal 146 and the piston top 107/valve body 120 even when the piston assembly 104 moves relative to the valve body 120.

The piston assembly 104 may include a filter 145 that screens debris. As shown in FIGS. 5-7, the filter 145 is an annular shaped screen (e.g., mesh, etc.) that fits around portions of the piston top 107 and the seal seat 106 that are located between the flange 179 of the piston top 107 and the retaining ring 164 of the seal seat 106. The filter 145 can remove debris from the water flowing through the inlet chamber 122 prior to entering the bleed passage 166, 167 of the piston assembly 104 (note that the filter 145 is not shown in FIGS. 3 and 4 to better visually convey geometry of inlet to bleed passage 166, 167). Thus, the filter 145 shown prohibits debris from passing through the filter 145 to the bleed passage 166, 177. The filter 145 may help prevent clogging of the bleed passage 166, 177 by keeping relatively large debris, which may otherwise clog the passages, from passing beyond the filter 145. The size of the screen openings (e.g., its porosity) can be tailored to screen different sized debris.

In operation, the flushometer 102 is configured to control flushing of the urinal 101 by passing a specific amount (e.g., a predetermined volume) of water through the flushometer 102 to the urinal 101.

The flushometer 102 may include a solenoid 147 disposed in an upper cavity between the top member 125 and a cover 148 coupled to the valve body 120 (see FIGS. 1-4). The solenoid 147 includes an armature 147a that is movable in an axial direction (of the armature 147a) between a first position corresponding to a non-flush position, in which the solenoid 147 inhibits flushing (e.g., dispensing) water, and a second position corresponding to a flush position, in which the specific amount of water is flushed (e.g., dispensed). The solenoid 147 can be electric powered, such as by an internal battery or in-line electric power. In the first position, the armature 147a is extended away from the body of the solenoid 147 to fluidly disconnect the pressure chamber 126 from the vent 120a in the valve body 120 (see FIGS. 3 and 4). The vent 120a has a first end that opens to the pressure chamber 126 and a second end that opens to the outlet chamber 124. When the armature 147a is in the first position, the armature 147a seals the first end of the vent 120a allowing the water pressure in the pressure chamber 126 to balance the water pressure in the inlet chamber 122, which forces the piston assembly 104 against the valve seat 132 to fluidly disconnect the inlet and outlet chambers 122, 124 (e.g., the non-flushing position).

The solenoid 147 is activated during a flush cycle, which can be initiated manually by a flush handle/button (e.g., the actuator 130) and/or automatically by a sensor. As shown in FIG. 1, a sensor 149 is located in the cover 148 to detect presence of a user at the urinal 101 and initiates a flush cycle after the detected user moves away from the urinal 101. Upon activation of the solenoid 147, the armature 147a retracts toward the body of the solenoid 147 to uncover the first end of the vent 120a and fluidly connect the pressure chamber 126 and the outlet chamber 124 through the vent 120a. This causes the pressurized water to vent from the pressure chamber 126 to the outlet chamber 124, which in turn reduces the pressure above the piston assembly 104 (e.g., on the piston top 107) causing the piston assembly 104 to move upward along the longitudinal axis (e.g., toward the top member 125 and the solenoid 147) to separate the seal 141 and the valve seat 132 and fluidly connect the inlet chamber 122 and the outlet chamber 124 through this spacing between the valve seat 132 and piston assembly 104 (as shown in FIG. 4). It should be clear that volume of water that passes between the valve seat 132 and piston assembly 104 is much greater than the volume of water the passes through the vent 120a.

Following a predetermined period of time (e.g., corresponding to a specified volume of flush water), the solenoid 147 moves the armature 147a from the second position (e.g., open) to the first position (e.g., closed) thereby resealing the vent 120a. After the vent 120a is closed, water flows (e.g., trickles) through the bleed passage 177 to allow the pressure chamber 126 to refill with water and re-pressurize. Upon the pressure chamber 126 reaching a threshold pressure/volume, the piston assembly 104 moves downward in the longitudinal direction to the closed position, in which the seal 141 contacts and seals against the valve seat 132, which is configured to terminate the flush cycle. From refilling, the pressure in the pressure chamber 126 equalizes with the pressure in the inlet chamber 122.

Thus, the downward movement (e.g., speed, timing, etc.) of the piston assembly 104 is influenced by, among other things, the size (e.g., diameter, length, etc.) of the bleed passage 177 and the mass of the piston assembly 104. Therefore, it is advantageous to precisely control the size of the bleed passage 177 during manufacturing and during use of the urinal 101, such as by preventing material build up in the bleed passage 177, which can impact flow.

Further, the upward movement of the piston assembly 104 is influenced by, among other things, the size of the vent 120a (e.g., the rate at which water flows from the pressure chamber 126 to the outlet chamber 124), size of the toggle, size and profile shape of the flow guide, size of the bleed hole in the piston assembly 104, and the mass of the piston assembly.

Figure 14:
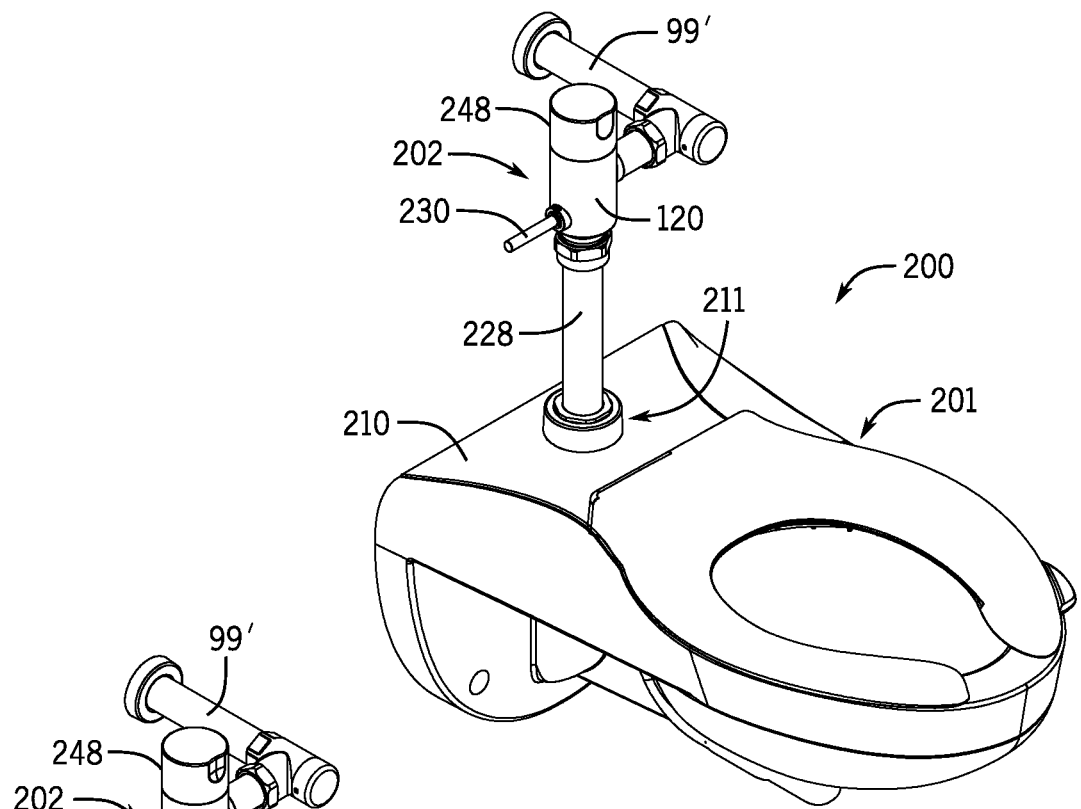
FIG. 14 is a perspective view of an embodiment of a toilet assembly that includes a flushometer valve, according to at least one embodiment of this application.
Figure 15:
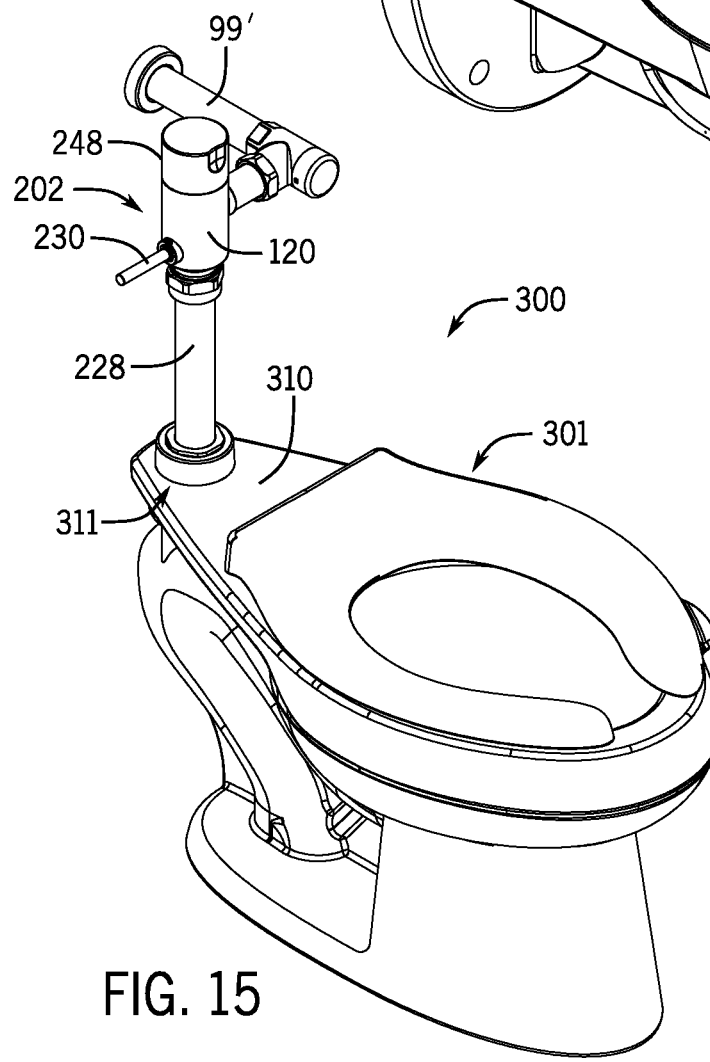
FIG. 15 is a perspective view of another embodiment of a toilet assembly that includes a flushometer valve, according to at least one embodiment of this application.

FIGS. 14 and 15 illustrate exemplary embodiments of toilet assemblies 200, 300 having flushometers according to this application. FIG. 14 shows an exemplary embodiment of a wall-mount toilet assembly 200 that includes a toilet 201 that is mountable to a wall having a drain pipe passing therethrough. The toilet 201 includes a mounting surface 210 for supporting a connecting pipe 228 and a flushometer 202. An inlet opening 211 in the toilet 201 allows flush water to pass from the flushometer 202 to the toilet 201 (e.g., through the connecting pipe 228). A water supply line 99' introduces water into the an inlet of the flushometer 202. The water supply line 99' may pass through the wall on which the toilet 201 is mounted. The flushometer 202 has a valve body 120, as described above, and a piston assembly (e.g., the piston assembly 104 described above) disposed in the valve body 120 for controlling operation of the flushometer 202 (e.g., flushing). Flushing of the toilet 201 can be manually controlled by a flush handle 230 extending from the valve body 120 (e.g., an actuation connection thereof) and/or automatically controlled by a sensor disposed in the cover 248 on the valve body 120. The flushometer 202 can be configured the same as or similar enough to the flushometer 102 described above.

FIG. 15 shows an exemplary embodiment of a pedestal type toilet assembly 300 that includes a toilet 301 that rests on the floor and is fluidly connected to a drain pipe in the floor. The toilet 301 includes a mounting surface 310 for supporting the connecting pipe 228 and the flushometer 202. An inlet opening 311 in the toilet 301 allows flush water to pass from the flushometer 202 through the connecting pip 228 to the toilet 301. Water is supplied to the flushometer 202 through the water supply line 99'. The flushometer 202 has a valve body 120 and a piston assembly (e.g., the piston assembly 104), as described above. The piston assembly is disposed in the valve body 120 for controlling operation of the flushometer 202 (e.g., flushing) in the manner described above. Flushing of the toilet 301 can be manually controlled by the flush handle 230 extending from the valve body 120 (e.g., an actuation connection) and/or automatically controlled by a sensor disposed in the cover 248 on the valve body 120. The flushometer 202 can be configured the same as or similar enough to the flushometer 102 described above.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the flushometers, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., valve body, piston assembly, insert, piston top, seal, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A flushometer valve for use with urinals, toilets and water closets, the flushometer valve comprising:
   a hollow body; and
   a piston assembly disposed inside the hollow body for controlling operation of the flushometer valve, the piston assembly and hollow body defining an inlet chamber, an outlet chamber and a pressure chamber, the piston assembly comprising:
      a flow guide movable relative to the hollow body between an open position, in which the outlet chamber is fluidly connected to the inlet chamber, and a closed position, in which the outlet chamber is fluidly disconnected from the inlet chamber;
      a piston top coupled to the flow guide and comprising a first material, the piston top having a bleed passage that fluidly connects the pressure chamber and the inlet chamber;
   an insert disposed within the bleed passage and comprising a second material that is different than the first material, the insert having a bore that fluidly connects the bleed passage and the pressure chamber;
   a seal carried by the flow guide, wherein the seal contacts a valve seat of the hollow body in the closed position and is separated from the valve seat in the open position to fluidly connect the inlet and outlet chambers; and
   a seal seat coupled to the flow guide to secure the seal between the flow guide and the seal seat, wherein the seal seat is disposed between the flow guide and the piston top to limit travel of the seal seat relative to the flow guide, and wherein the seal seat comprises a bleed passage that fluidly connects the bleed passage of the piston top and the inlet chamber.

2. The piston assembly of claim 1, wherein the first material comprises a glass filler, and the second material does not include any glass content.

3. A flushometer valve for use with urinals, toilets and water closets, the flushometer valve comprising:
   a hollow valve body having an inlet chamber, an outlet chamber, and a valve seat; a piston assembly disposed inside of and movable in a longitudinal direction relative to the hollow valve body between an open position, in which the outlet chamber is fluidly connected to the inlet chamber, and a closed position, in which the outlet chamber is fluidly disconnected from the inlet chamber, the piston assembly comprising:
      a flow guide comprising a generally annular base that extends in the longitudinal direction, a flange extending radially outward from the base, and a first catch that is offset in the longitudinal direction from the flange and extends radially outward from the base;
      a seal seat comprising a generally annular body, which is disposed around the base, and a second catch that extends radially inward from the body to engage the first catch of the flow guide to prevent relative motion between the flow guide and the seal seat in the longitudinal direction; and
      a seal retained between an end of the seal seat and the flange of the flow guide, wherein the seal engages the valve seat in the closed position of the piston assembly; and
      a piston top comprising threads that threadedly couple threads of the flow guide to couple the piston top and flow guide together, the piston top having a bleed passage that fluidly connects a pressure chamber and the inlet chamber.

4. The flushometer valve of claim 3, wherein the seal is compliant and is retained between the seal seat and the flow guide in a compressed state to impart a biasing force between the first catch and the second catch.

5. The flushometer valve of claim 4, wherein the biasing force biases the first catch and the second catch toward one another into a locking position.

6. The flushometer valve of claim 3, further comprising:
   an insert disposed within a counterbore of the bleed passage, the insert having a bore that fluidly connects the bleed passage and the pressure chamber.

7. The flushometer valve of claim 6, further comprising a weld coupling the insert to the piston top, wherein the piston top comprises a first material and the insert comprises a second material that is different than the first material.

8. The flushometer valve of claim 3, wherein the flow guide further comprises:
   a first wall that extends inwardly from an inner surface of the base, the first wall being generally opposite the first catch;
   a second wall extending from an inner end of the first wall in the longitudinal direction to define a retaining channel along with the first wall and the base; and
   a toggle seal disposed and retained in the retaining channel.

9. A flushometer valve for use with urinals, toilets and water closets, the flushometer valve comprising:
   a hollow valve body having an inlet chamber, an outlet chamber, and a valve seat; and
   a piston assembly disposed inside of and movable in a longitudinal direction relative to the hollow valve body between an open position, in which the outlet chamber is fluidly connected to the inlet chamber, and a closed position, in which the outlet chamber is fluidly disconnected from the inlet chamber, the piston assembly comprising:
      a flow guide comprising a generally annular base that extends in the longitudinal direction, a flange extending radially outward from the base, and a first catch that is offset in the longitudinal direction from the flange and extends radially outward from the base;
      a seal seat comprising a generally annular body, which is disposed around the base, and a second catch that extends radially inward from the body to engage the first catch of the flow guide to prevent relative motion between the flow guide and the seal seat in the longitudinal direction; and
      a seal retained between an end of the seal seat and the flange of the flow guide,
   wherein the seal engages the valve seat in the closed position of the piston assembly, and
   wherein the first catch comprises a plurality of outer projections arranged in an annular array around a circumference of the flow guide, each outer projection extends radially outward from the base and is offset from the flange in the longitudinal direction by a common first distance, and each pair of adjacent outer projections is separated by a first angular gap.

10. The flushometer valve of claim 9, wherein the second catch comprises a single continuous annular inner projection that extends radially inwardly from the body.

11. The flushometer valve of claim 9, wherein the second catch comprises a plurality of inner projections arranged in an annular array around a circumference of the seal seat, each inner projection extends radially inward from the body and is offset from the flange in the longitudinal direction by a common second distance, and each pair of adjacent outer projections is separated by a second angular gap.

12. A piston assembly for controlling operation of a flushometer valve by moving relative to a hollow body of the flushometer valve between an open position, in which an inlet chamber of the flushometer valve is fluidly connected to an outlet chamber of the flushometer valve, and a closed position, in which the inlet chamber is fluidly disconnected from the outlet chamber, the flushometer valve having a pressure chamber that is separated from the inlet and outlet chambers, the piston assembly comprising:
    a flow guide having a threaded base;
    a piston top comprising:
        a threaded body coupled to the threaded base; and
        a bleed passage extending through the threaded body to fluidly connect the pressure chamber and the inlet chamber, the bleed passage having a counterbore in an end adjacent to the pressure chamber;
    an insert disposed within the counterbore of the bleed passage, the insert having a bore that fluidly connects the bleed passage and the pressure chamber;
    a seal seat comprising:
        an annular body disposed around the threaded base;
        a notch disposed in an end of the annular body adjacent to the piston top so that the notch defines an inlet of the bleed passage with the piston top; and
        a catch that extends radially inward from the annular body and engages an outer catch of the flow guide to prevent relative motion between the flow guide and the seal seat in a longitudinal direction along which the piston assembly moves; and
    a seal retained between an end of the seal seat and an outer flange of the flow guide, wherein the seal is configured to engage a valve seat of the flushometer valve in the closed position and disengage from the valve seat in the open position;
    wherein the piston top comprises a first material and the insert comprises a second material that is different than the first material; and
    wherein the bore has a size that is smaller than a size of the bleed passage.

13. The piston assembly of claim 12, wherein the first material comprises a glass filler, and the second material does not include any glass content.

* * * * *